(12) United States Patent
Immink et al.

(10) Patent No.: US 8,166,773 B2
(45) Date of Patent: May 1, 2012

(54) REFRIGERATION CAPACITY BANKING FOR THERMAL CYCLING

(75) Inventors: Darin E. Immink, Holland, MI (US);
Clinton A. Peterson, Holland, MI (US);
Andrew R. Veldt, Saugatuck, MI (US)

(73) Assignee: Venturedyne, Ltd., Pewaukee, WI (US)

( * ) Notice: Subject to any disclaimer, the term of this patent is extended or adjusted under 35 U.S.C. 154(b) by 831 days.

(21) Appl. No.: 12/247,418

(22) Filed: Oct. 8, 2008

(65) Prior Publication Data
US 2010/0083691 A1 Apr. 8, 2010

(51) Int. Cl.
*F25B 13/00* (2006.01)
(52) U.S. Cl. ............... 62/324.1; 62/335; 62/498
(58) Field of Classification Search .......... 62/324.1, 62/159, 238.7, 160, 157, 335, 434, 498, 179, 62/180, 509, 510
See application file for complete search history.

(56) References Cited

U.S. PATENT DOCUMENTS

| 2,680,956 | A |   | 6/1954 | Haas |
| 2,787,128 | A | * | 4/1957 | Brown ................ 62/90 |
| 3,664,150 | A | * | 5/1972 | Patterson ............. 62/234 |
| 4,374,468 | A | * | 2/1983 | Takeshita et al. ...... 62/333 |
| 4,391,104 | A | * | 7/1983 | Wendschlag .......... 62/79 |
| 4,646,539 | A |   | 3/1987 | Taylor |
| 4,916,916 | A |   | 4/1990 | Fischer |
| 4,940,079 | A |   | 7/1990 | Best et al. |
| 4,964,279 | A |   | 10/1990 | Osborne |
| 5,237,832 | A |   | 8/1993 | Alston |
| 5,255,526 | A |   | 10/1993 | Fischer |
| 5,307,642 | A |   | 5/1994 | Dean |
| 5,386,709 | A |   | 2/1995 | Aaron |
| 5,678,626 | A |   | 10/1997 | Gilles |
| 5,682,752 | A |   | 11/1997 | Dean |
| 5,713,211 | A |   | 2/1998 | Sherwood |
| 5,755,104 | A |   | 5/1998 | Rafalovich et al. |
| 5,819,549 | A |   | 10/1998 | Sherwood |
| 6,158,499 | A |   | 12/2000 | Rhodes et al. |
| RE37,054 | E |   | 2/2001 | Sherwood |
| 6,615,602 | B2 | * | 9/2003 | Wilkinson .............. 62/238.7 |
| 6,751,972 | B1 | * | 6/2004 | Jungwirth ............... 62/238.6 |
| 6,955,065 | B2 |   | 10/2005 | Taylor et al. |
| 7,124,594 | B2 |   | 10/2006 | McRell |
| 7,162,878 | B2 |   | 1/2007 | Narayanamurthy et al. |
| 7,228,690 | B2 |   | 6/2007 | Barker et al. |
| 7,363,772 | B2 |   | 4/2008 | Narayanamurthy |

(Continued)

FOREIGN PATENT DOCUMENTS
EP 1116947 7/2001

*Primary Examiner* — Mohammad Ali
(74) *Attorney, Agent, or Firm* — Michael Best & Friedrich LLP

(57) ABSTRACT

A thermal cycling system includes a structure defining a load space, a heating assembly positioned to heat to the load space, and a cooling assembly positioned to cool the load space. The cooling assembly includes a refrigeration circuit and a banking circuit. The refrigeration circuit has a compressor, a refrigeration condenser, a first refrigeration evaporator in direct thermal communication with the load space, a second refrigeration evaporator in parallel with the first evaporator, and primary refrigerant circulating throughout the refrigeration circuit. The banking circuit is gravity fed and includes a banking condenser, a banking evaporator positioned to cool the load space, and a banking refrigerant circulating throughout the banking circuit. The banking condenser includes a collection reservoir to store liquid banking refrigerant and is in thermal communication with the second refrigeration evaporator.

23 Claims, 2 Drawing Sheets

U.S. PATENT DOCUMENTS

| | | |
|---|---|---|
| 2002/0162342 A1 | 11/2002 | Weng et al. |
| 2005/0172659 A1 | 8/2005 | Barker et al. |
| 2005/0210903 A1* | 9/2005 | Allen .............................. 62/244 |
| 2006/0070385 A1 | 4/2006 | Narayanamurthy et al. |
| 2006/0137853 A1* | 6/2006 | Haller et al. .................... 165/42 |
| 2008/0022713 A1 | 1/2008 | Jacobi |
| 2008/0034760 A1 | 2/2008 | Narayanamurthy et al. |
| 2008/0087034 A1* | 4/2008 | Jackson et al. .................. 62/235 |

* cited by examiner

REFRIGERATION CAPACITY BANKING FOR THERMAL CYCLING

BACKGROUND

The present invention generally relates to test equipment, and specifically to test equipment for repetitive thermal cycling between high and low temperatures.

Thermal cycling test equipment, such as environmental test chambers, are commonly used to test products by subjecting them to thermal shock, i.e., rapidly transitioning between high and low temperature extremes with short dwells at each extreme. This type of testing results in inefficient use of a refrigeration system, which operates under high capacity requirements during the rapid cooling cycle and no cooling requirements for other intervals of the testing. To achieve the rapid cooling required, large capacity refrigeration systems relative to the workspace or product load are commonly utilized.

Thermal shock tests were previously performed by physically transporting a test product between separate heating and cooling chambers. The test product was transported by a human operator or a mechanical conveyor. Transport by a human operator created error in transition times between the high and low temperature extremes. Furthermore, movement of the test product created mechanical stresses and caused logistic difficulties if the test product needed to be plugged in, for example.

SUMMARY

The present invention provides a structure defining a load space, a heating assembly positioned to heat the load space, and a cooling assembly positioned to cool the load space.

In one aspect, the cooling assembly includes a refrigeration circuit having a compressor, a refrigeration condenser, a refrigeration evaporator, and primary refrigerant circulating throughout the refrigeration circuit, and a banking circuit having a banking condenser, a banking evaporator positioned to cool the load space, and a banking refrigerant circulating throughout the banking circuit. The banking condenser includes a collecting reservoir for collecting banking refrigerant, the collecting reservoir being in thermal communication with the refrigeration evaporator.

In another aspect, the cooling assembly includes a refrigeration circuit having a compressor, a refrigeration condenser, a refrigeration evaporator, and primary refrigerant circulating throughout the refrigeration circuit. The cooling assembly also includes a banking circuit having a banking condenser, a banking evaporator positioned in direct thermal communication with the load space, and a banking refrigerant circulating throughout the banking circuit. The banking circuit is gravity fed.

In yet another aspect, the cooling assembly includes a refrigeration circuit having a compressor, a refrigeration condenser, a first refrigeration evaporator in direct thermal communication with the load space, a second refrigeration evaporator in parallel with the first evaporator, and primary refrigerant circulating throughout the refrigeration circuit. The cooling assembly also includes a banking circuit having a banking condenser, a banking evaporator positioned to cool the load space, and a banking refrigerant circulating throughout the banking circuit. The banking condenser is in thermal communication with the second refrigeration evaporator.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items.

Figure 1:
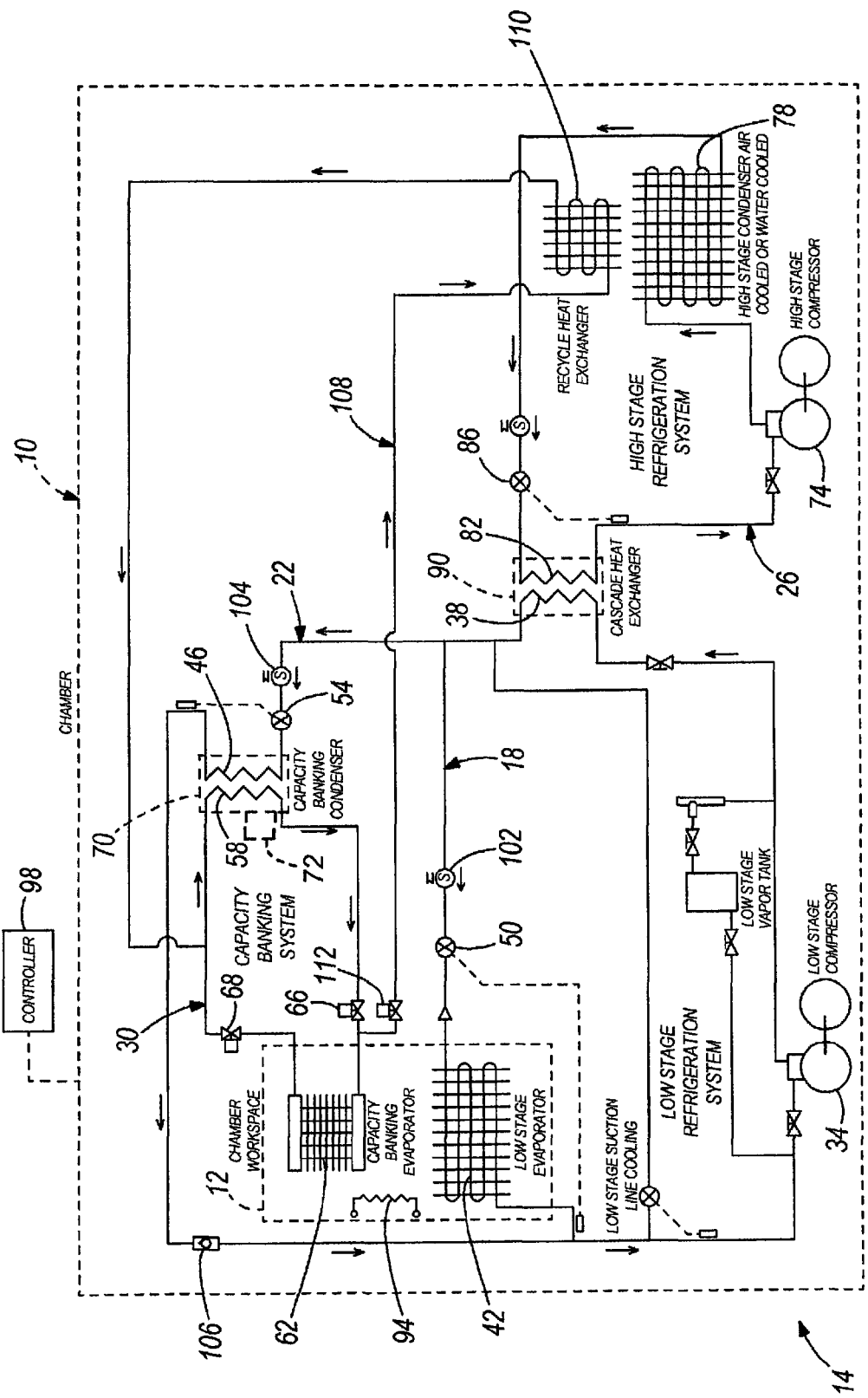
FIG. 1 is a schematic of a thermal cycling system embodying the present invention.

The refrigeration system 10 shown in FIG. 1 is used in an environmental test chamber or load space 12 in which products are thermally shocked by rapidly transitioning the test chamber environment 12 between heating and cooling operations (high and low temperature extremes). The refrigeration system 10 includes a low stage or primary refrigeration system 14 circulating a primary refrigerant, a fluidly separate high stage refrigeration system 26 circulating a secondary refrigerant, and a fluidly separate capacity banking circuit 30 circulating a banking refrigerant. The load space 12 also includes a heating assembly 94 to heat the load space 12 to the high temperature extreme.

A controller 98 is programmed to operate the refrigeration system 10 and the heating assembly 94 according to a programmed cycle of alternating between a heating mode and a cooling mode, which will be explained in greater detail below.

The primary refrigeration system 14 includes a first evaporator path 18 and a second evaporator path 22 in parallel with the first evaporator path 18. The primary refrigeration system 14 includes a low stage compressor 34, a low stage condenser 38, a primary evaporator 42, a secondary evaporator 46, a first solenoid valve 102 and a first expansion valve 50 just upstream of the primary evaporator 42, a second solenoid valve 104 and a second expansion valve 54 just upstream of the secondary evaporator 46, and a check valve 106 just downstream of the secondary evaporator 46. The primary evaporator 42 is positioned within the test chamber 12 in heat transfer communication with the test chamber 12 to cool the test chamber 12. The first evaporator path 18 includes the low stage compressor 34, the low stage condenser 38, the first solenoid valve 102, the first expansion valve 50, and the primary evaporator 42. The second evaporator path 22 includes the low stage compressor 34, the low stage condenser 38, the second solenoid valve 104, the second expansion valve 54, the secondary evaporator 46, and the check valve 106. The check valve 106 prevents reverse flow of primary refrigerant. Without the check valve 106, warm primary refrigerant leaving the primary evaporator 42 could migrate toward and condense in the secondary evaporator 46, thus releasing heat instead of absorbing it. Furthermore, this would cause the first evaporator path 18 to run low on primary refrigerant.

The high stage refrigeration system 26 includes a high stage compressor 74, a high stage condenser 78 which may be air-cooled or water-cooled, a high stage evaporator 82, and a high stage expansion valve 86 just upstream of the high stage evaporator 82. The high stage evaporator 82 and the low stage condenser 38 form a cascade heat exchanger 90 in which the low stage condenser 38 rejects heat to the high stage evaporator 82 to cool and condense the primary refrigerant, as is well understood in the art. The high stage refrigeration system 26 can be operated to circulate secondary refrigerant to the high stage evaporator 82 when at least one of the first and second evaporator paths 18, 22 is running and therefore in need of cooling.

The capacity banking circuit 30 includes a capacity banking condenser 58, a capacity banking evaporator 62 positioned within the test chamber 12 in heat transfer communication with the test chamber 12 to cool the test chamber 12, a first isolation valve 66 (such as a ball valve) just upstream of the capacity banking evaporator 62, and a second isolation valve 68 (such as a ball valve) just downstream of the capacity banking evaporator 62. The capacity banking condenser 58 and the secondary evaporator 46 collectively form a capacity banking heat exchanger 70 in which the secondary evaporator 46 cools and condenses refrigerant in the capacity banking condenser 58 and cools the mass of the capacity banking heat exchanger 70.

The capacity banking condenser 58 includes a collecting reservoir 72 for collecting banking refrigerant. Liquid banking refrigerant is stored in the collecting reservoir 72 to store cooling capacity for use when needed. When additional cooling capacity is needed (e.g., when the test chamber environment must be rapidly transitioned from hot to cold), the stored banking refrigerant is released, as described in greater detail below. The banking refrigerant circulates through the capacity banking circuit 30 by gravity and phase change circulation. The capacity banking condenser 58 and the collecting reservoir 72 are elevated with respect to the capacity banking evaporator 62. Liquid banking refrigerant condensed in the capacity banking condenser 58, having a higher density than vapor, falls to the capacity banking evaporator 62 by gravity when the isolation valve 66 is open. Banking refrigerant changing phase from liquid to vapor (evaporation) in the capacity banking evaporator 62 rises in pressure relative to the capacity banking condenser 58 and returns to the elevated capacity banking condenser 58 through a conduit, drawn to the area of lower pressure created by the vapor-to-liquid phase change (condensation) of the banking refrigerant in the capacity banking condenser 58. In this way, liquid banking refrigerant is prevented from migrating to the capacity banking condenser 58 and vapor banking refrigerant is prevented from entering the capacity banking evaporator 62. Thus, the liquid banking refrigerant is substantially kept separate from the vapor banking refrigerant. In this manner, the heat rejected from the load space 12 is efficiently moved to the capacity baking heat exchanger 70. In other constructions, a pump may be employed to circulate the banking refrigerant.

The heating assembly 94 is positioned at least partially within the test chamber 12 to heat the test chamber 12 during a heating mode. The heating assembly 94 may include an electric heater, a steam heating circuit, a glycol heating circuit, or the like.

Figure 2:
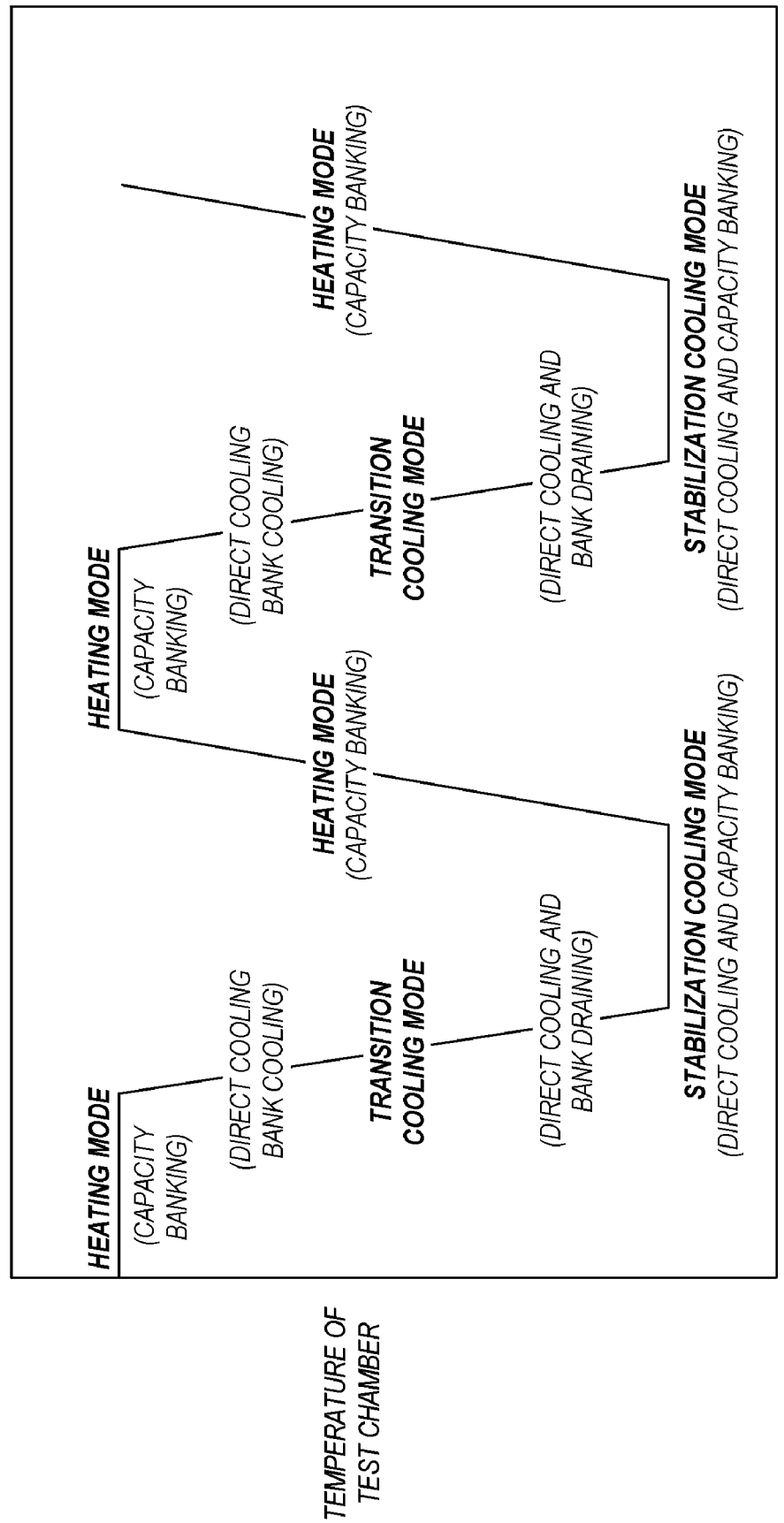
FIG. 2 is a plot of time vs. temperature of the thermal cycling system of FIG. 1.

With reference to FIG. 2, the cooling mode includes a transition cooling mode that begins when cooling to a setpoint cooling temperature is first demanded and ends when the setpoint cooling temperature is reached. The cooling mode also includes a stabilization cooling mode that begins when the setpoint cooling temperature is reached and ends when the setpoint cooling temperature is no longer demanded (e.g., when heating is demanded, when the system 10 is shut off, etc. . . . ). The heating mode begins when heating is demanded and ends when heating is no longer demanded (e.g., when cooling is demanded and the transition cooling mode begins, when the system 10 is shut off, etc. . . . ).

Products are positioned within the test chamber 12 and are thermally shocked by the rapid alternating of extreme hot and cold temperatures. For example, to perform a Military standard test (in compliance with MIL-STD-883C 1010.7 method C), a product temperature change from 150° C. to −65° C. (302° F. to −85° F.) must occur in 15 minutes. A transition time is the duration of the transition cooling mode. Preferably, the transition time is short (e.g., 15 minutes) to thermally shock the products.

During the heating mode, the heating assembly 94 provides heat to the test chamber 12. Furthermore, flow of the primary refrigerant in first evaporator path 18 is stopped, flow of the primary refrigerant in the second evaporator path 22 is continued to circulate the primary refrigerant to the secondary evaporator 46, and flow of the banking refrigerant in the capacity banking circuit 30 is stopped. Thus, capacity banking occurs during the heating mode. To stop the flow of primary refrigerant in the first evaporator path 18, a solenoid valve 102 is positioned just upstream of the first expansion valve 50. When the solenoid valve 102 is closed, the primary refrigerant does not circulate to the primary evaporator 42. Thus, the primary evaporator 42 does not provide cooling to the test chamber 12 during the heating mode. However, the primary refrigerant circulates to the secondary evaporator 46 during the heating mode. The primary refrigerant evaporates (i.e., vaporizes) in the secondary evaporator 46 to cool and condense banking refrigerant in the banking condenser 58 and to cool the mass of the banking heat exchanger 70. Flow of the banking refrigerant in the capacity banking circuit 30 is stopped by closing the first isolation valve 66. The second isolation valve 68 is open to allow banking refrigerant to migrate toward the capacity banking condenser 58, to prevent the build up of pressure in an isolated section, as the banking refrigerant heats up and evaporates. Thus, the capacity banking evaporator 62 does not provide cooling to the test chamber 12 during the heating mode, and the second evaporator 46 and the capacity banking condenser 58 are operable to store cooling capacity during the heating mode.

During the transition cooling mode, all of the primary refrigerant is circulated to the primary evaporator 42 along the first evaporator path 18 to concentrate the cooling capacity of the primary refrigerant directly on the load space 12. Furthermore, to provide additional cooling and reduce the transition time, banking refrigerant is circulated through the capacity banking circuit 30 to the capacity banking evaporator 62 to additionally cool the load space 12 using cooling capacity stored in the banking refrigerant and in the mass of the capacity banking heat exchanger 70. The stored and cooled liquid banking refrigerant evaporates (i.e., vaporizes) in the capacity banking evaporator 62 and absorbs heat from the test chamber 12 to cool the test chamber 12. The first isolation valve 66 is opened to release the stored liquid banking refrigerant to the capacity banking evaporator 62 for evaporation. The second isolation valve 68 is opened to allow vapor to return to the capacity banking condenser 58. Thus, the capacity banking evaporator 62 provides rapid cooling to the test chamber 12 during the transition cooling mode by releasing cooling capacity stored in the form of liquid banking refrigerant to the capacity banking evaporator 62. Furthermore, cooling capacity stored in the mass of the capacity banking heat exchanger 70 is transferred to the banking refrigerant as the banking refrigerant vapor returns from the capacity banking evaporator 62, condenses in the capacity banking condenser 58 thus rejecting heat to the capacity banking heat exchanger 70, and circulates back to the capacity banking evaporator 62, providing further rapid cooling from stored cooling capacity during the transition cooling mode.

During the transition cooling mode, the pressure in the capacity banking evaporator 62 is monitored by the controller 98 with a pressure transducer (not shown) so that a saturation temperature of banking refrigerant in the capacity banking evaporator 62 can be determined. Alternatively, a temperature sensor may be provided in the banking circuit 30 to determine the saturation temperature of banking refrigerant directly. The temperature of the load space 12 is also monitored by the controller 98 with a temperature sensor (not shown). If the temperature of the load space 12 is greater than the saturation temperature in the capacity banking evaporator 62, then the first and second isolation valves 66, 68 are open and the load space 12 is cooled. However, if the temperature of the load space 12 is lower than the saturation temperature, effective cooling of the load space 12 will not be provided and the controller 98 closes the first isolation valve 66 to prevent the circulation of banking refrigerant in the banking circuit 30.

A draining circuit 108 is provided to drain banking refrigerant from the capacity banking evaporator 62 (bank draining) during the transition cooling mode when the saturation temperature of the banking refrigerant is higher than the temperature of the load space 12. When the saturation temperature of the banking refrigerant in the capacity banking evaporator 62 is higher than the temperature of the load space 12, the banking refrigerant becomes an added load on the load space 12. Therefore, it is advantageous to remove the banking refrigerant from the capacity banking evaporator 62 to reduce the load on the load space 12. The controller 98 closes the first and second isolation valves 66, 68 and liquid banking refrigerant is drained by opening a third isolation valve 112 (such as a ball valve) such that the liquid banking refrigerant drains by gravity into the draining circuit 108. The liquid banking refrigerant flows by gravity to a recycle heat exchanger 110 in heat transfer communication with the high stage condenser 78. Liquid banking refrigerant in the recycle heat exchanger 78 is heated and vaporized by the high stage condenser 78, and vapor banking refrigerant is directed to the capacity banking condenser 58 by phase change circulation.

During the stabilization cooling mode, the primary refrigeration system 14 circulates the primary refrigerant through the first evaporator path 18 (direct cooling) to maintain the setpoint cooling temperature and through the second evaporator path 22 (capacity banking) to store cooling capacity in the manner described above. The first solenoid valve 102 is opened to allow the primary refrigerant to flow to the primary evaporator 42. Thus, the primary evaporator 42 provides cooling to the test chamber 12 during the stabilization cooling mode. The second solenoid valve 104 is open to allow the primary refrigerant to flow to the secondary evaporator 46. Primary refrigerant is circulated to the secondary evaporator 46 along the second evaporator path 22. Thus, the secondary evaporator 46 transfers cooling capacity to the capacity banking condenser 58 and the banking refrigerant during the stabilization cooling mode. However, the isolation valve 66 is closed so banking refrigerant is not circulated through the capacity banking circuit 30 to the capacity banking evaporator 62 during the cooling mode. Isolation valve 68 is closed to prevent refrigerant migration to the capacity banking evaporator 62 while the load space 12 is at low temperature stabilization.

In the preferred embodiment, the primary refrigerant is circulated through the second evaporator path 22 (capacity banking) during the heating mode and the stabilization cooling mode, but not the transition cooling mode.

The refrigeration system 10 stores cooling capacity during the heating mode and the stabilization cooling mode to be used when needed and provides rapid cooling (bank cooling) to the test chamber 12 during the transition cooling mode when the saturation temperature of the banking refrigerant is lower than the temperature of the load space 12. In this way, a smaller refrigeration system can be used to achieve the same relative cooling performance, reducing the overall size of the equipment. Furthermore, the transition time is reduced.

Various features and advantages are set forth in the following claims.

The invention claimed is:

1. A thermal cycling system comprising:
   a structure defining a load space;
   a heating assembly positioned to heat to the load space;
   a cooling assembly positioned to cool the load space, the cooling assembly comprising:
   a refrigeration circuit having a compressor, a refrigeration condenser, a refrigeration evaporator, and primary refrigerant circulating throughout the refrigeration circuit; and
   a banking circuit having a banking condenser, a banking evaporator positioned to cool the load space, and a banking refrigerant circulating throughout the banking circuit, wherein the banking condenser includes a collecting reservoir for collecting banking refrigerant, the collecting reservoir being in thermal communication with the refrigeration evaporator; and
   a controller programmed to operate the thermal cycling system in a heating mode in which the heating assembly heats the load space and a cooling mode in which the cooling assembly cools the load space.

2. The thermal cycling system of claim 1, wherein the controller is programmed to operate the system according to a programmed cycle of alternating the heating mode and the cooling mode, wherein a transition cooling mode is defined as the transition from the heating mode to the cooling mode.

3. The thermal cycling system of claim 2, the refrigeration circuit further having a second refrigeration evaporator, wherein the controller is programmed such that, during the heating mode, the heating assembly provides heat to the load space; the refrigeration circuit directs primary refrigerant to the first refrigeration evaporator and not to the second refrigeration evaporator; and the banking circuit inhibits circulation of banking refrigerant through the banking circuit.

4. The thermal cycling system of claim 3, wherein the first refrigeration evaporator and the banking condenser are positioned in thermal communication to cool and condense the banking refrigerant.

5. The thermal cycling system of claim 2, wherein the cooling assembly further comprises a second refrigeration evaporator, wherein the controller is programmed such that, during the cooling mode, the refrigeration circuit directs primary refrigerant to both the first and second refrigeration evaporators; and the banking circuit inhibits circulation of banking refrigerant through the banking circuit.

6. The thermal cycling system of claim 2, wherein the controller is programmed such that, during the transition cooling mode, banking refrigerant in the collecting reservoir is in liquid form and is allowed to flow from the collecting reservoir toward the banking evaporator where the banking refrigerant will at least partially vaporize.

7. The thermal cycling system of claim 6, wherein during the transition cooling mode the banking refrigerant circulates by gravity.

8. The thermal cycling system of claim 1, wherein the refrigeration circuit is a low-stage circuit, and wherein the cooling assembly further includes a high-stage circuit and a cascade heat exchanger thermally coupling the low-stage circuit to the high-stage circuit.

9. A thermal cycling system comprising:
a structure defining a load space;
a heating assembly positioned to heat to the load space;
a cooling assembly positioned to cool the load space, the cooling assembly comprising:
 a refrigeration circuit having a compressor, a refrigeration condenser, a refrigeration evaporator, and primary refrigerant circulating throughout the refrigeration circuit; and
 a banking circuit having a banking condenser, a banking evaporator positioned in direct thermal communication with the load space, and a banking refrigerant circulating throughout the banking circuit, wherein the banking circuit is gravity fed; and
a controller programmed to operate the thermal cycling system in a heating mode in which the heating assembly heats the load space and a cooling mode in which the cooling assembly cools the load space.

10. The thermal cycling system of claim 9, wherein the controller is programmed to operate the system according to a programmed cycle of alternating the heating mode and the cooling mode, wherein a transition cooling mode is defined as the temperature transition from the heating mode to the cooling mode.

11. The thermal cycling system of claim 10, wherein the refrigeration circuit further has a second refrigeration evaporator, wherein the controller is programmed such that, during the heating mode, the heating assembly provides heat to the load space; the refrigeration circuit directs primary refrigerant to the second refrigeration evaporator and not to the first refrigeration evaporator; and the banking circuit inhibits circulation of banking refrigerant through the banking circuit.

12. The thermal cycling system of claim 10, the refrigeration circuit further having a second refrigeration evaporator, wherein the controller is programmed such that, during the transition cooling mode, the refrigeration circuit directs primary refrigerant to the first refrigeration evaporator and not to the second refrigeration evaporator; and the banking circuit allows circulation of banking refrigerant through the banking circuit via gravity.

13. The thermal cycling system of claim 10, wherein the banking condenser includes a collecting reservoir for collecting banking refrigerant, and wherein the controller is programmed such that, during the transition cooling mode, banking refrigerant in the collecting reservoir is in liquid form and is allowed to flow from the collecting reservoir toward the banking evaporator where the banking refrigerant will at least partially vaporize.

14. The thermal cycling system of claim 10, the cooling assembly further comprising a second refrigeration evaporator, wherein the controller is programmed such that, during the cooling mode, the refrigeration circuit directs primary refrigerant to both the first and second refrigeration evaporators, and the banking circuit inhibits circulation of banking refrigerant through the banking circuit.

15. The thermal cycling system of claim 9, wherein the refrigeration circuit is a low-stage circuit, and wherein the cooling assembly further includes a high-stage circuit, and a cascade heat exchanger thermally coupling the low-stage circuit to the high-stage circuit.

16. A thermal cycling system comprising:
a structure defining a load space;
a heating assembly positioned to heat to the load space;
a cooling assembly positioned to cool the load space, the cooling assembly comprising:
 a refrigeration circuit having a compressor, a refrigeration condenser, a first refrigeration evaporator in direct thermal communication with the load space, a second refrigeration evaporator in parallel with the first evaporator, and primary refrigerant circulating throughout the refrigeration circuit; and
 a banking circuit having a banking condenser, a banking evaporator positioned to cool the load space, and a banking refrigerant circulating throughout the banking circuit, wherein the banking condenser is in thermal communication with the second refrigeration evaporator; and
a controller programmed to operate the thermal cycling system in a heating mode in which the heating assembly heats the load space and a cooling mode in which the cooling assembly cools the load space.

17. The thermal cycling system of claim 16, wherein the controller is programmed to operate the system according to a programmed cycle of alternating the heating mode and the cooling mode, wherein a transition cooling mode is defined as the temperature transition from the heating mode to the cooling mode.

18. The thermal cycling system of claim 17, wherein the controller is programmed such that, during the heating mode, the heating assembly provides heat to the load space; the refrigeration circuit directs primary refrigerant to the second refrigeration evaporator and not to the first refrigeration evaporator; and the banking circuit inhibits circulation of banking refrigerant through the banking circuit.

19. The thermal cycling system of claim 17, wherein the controller is programmed such that, during the cooling mode, the refrigeration circuit directs primary refrigerant to both the first and second refrigeration evaporators; and the banking circuit inhibits circulation of banking refrigerant through the banking circuit.

20. The thermal cycling system of claim 17, wherein the banking condenser includes a collecting reservoir for collecting banking refrigerant, and wherein, during the transition cooling mode, banking refrigerant in the collecting reservoir is in liquid form and is allowed to flow from the collecting reservoir toward the banking evaporator where the banking refrigerant will at least partially vaporize.

21. The thermal cycling system of claim 20, wherein during the transition cooling mode the banking refrigerant is gravity fed.

22. The thermal cycling system of claim 16, wherein the refrigeration circuit is a low-stage circuit, and wherein the cooling assembly further includes a high-stage circuit, and a cascade heat exchanger thermally coupling the low-stage circuit to the high-stage circuit.

23. The thermal cycling system of claim 16, further comprising a draining circuit in fluid communication with the banking evaporator to remove banking refrigerant from the banking evaporator when a saturation temperature of the banking refrigerant is higher than a temperature of the load space.

* * * * *